(12) United States Patent
Yi et al.

(10) Patent No.: US 10,039,055 B2
(45) Date of Patent: Jul. 31, 2018

(54) METHOD FOR MONITORING A PHYSICAL DOWNLINK CONTROL CHANNEL DURING DRX OPERATION IN A WIRELESS COMMUNICATION SYSTEM AND A DEVICE THEREFOR

(71) Applicant: LG ELECTRONICS INC., Seoul (KR)

(72) Inventors: Seungjune Yi, Seoul (KR); Sunyoung Lee, Seoul (KR); Sungjun Park, Seoul (KR)

(73) Assignee: LG Electronics Inc., Seoul (KR)

(*) Notice: Subject to any disclaimer, the term of this patent is extended or adjusted under 35 U.S.C. 154(b) by 71 days.

(21) Appl. No.: 14/905,140

(22) PCT Filed: Jul. 9, 2014

(86) PCT No.: PCT/KR2014/006149
§ 371 (c)(1),
(2) Date: Jan. 14, 2016

(87) PCT Pub. No.: WO2015/008967
PCT Pub. Date: Jan. 22, 2015

(65) Prior Publication Data
US 2016/0165539 A1 Jun. 9, 2016

Related U.S. Application Data

(60) Provisional application No. 61/856,071, filed on Jul. 19, 2013.

(51) Int. Cl.
*H04L 1/00* (2006.01)
*H04W 52/02* (2009.01)
*H04W 76/28* (2018.01)

(52) U.S. Cl.
CPC ... *H04W 52/0216* (2013.01); *H04W 52/0229* (2013.01); *H04W 76/28* (2018.02);
(Continued)

(58) Field of Classification Search
CPC .............. H04J 2203/0019; H04L 12/18; H04L 12/184; H04L 12/1845; H04L 12/185;
(Continued)

(56) References Cited

U.S. PATENT DOCUMENTS

| 2011/0243048 A1 | 10/2011 | Wang et al. |
| 2013/0182626 A1 | 7/2013 | Kuo |
| 2014/0211673 A1* | 7/2014 | Lu .................... H04W 52/0212 370/311 |

FOREIGN PATENT DOCUMENTS

| JP | 2010-114892 A | 5/2010 |
| KR | 10-2009-0086441 A | 8/2009 |

OTHER PUBLICATIONS

Sharp: "Dynamic update of PDCCH monitoring set", R1-101373, 3GPP TSG-RAN WG1#60, San Francisco, USA, Feb. 22-26, 2010, pp. 1-2.

* cited by examiner

*Primary Examiner* — Dady Chery
(74) *Attorney, Agent, or Firm* — Dentons US LLP

(57) ABSTRACT

The present invention relates to a wireless communication system. More specifically, the present invention relates to a method and a device for monitoring a PDCCH during a DRX (Discontinuous Reception) operation in a wireless communication system, the method comprising: receiving first DRX (Discontinuous Reception) information from the first BS; receiving second DRX information from the second BS; and monitoring a PDCCH (Physical Downlink Control Channel) for the first BS during an active time for the second (Continued)

BS, wherein the active time for the second BS includes one or more On Durations indicated by the second DRX information.

18 Claims, 14 Drawing Sheets

(52) U.S. Cl.
CPC .......... *Y02D 70/00* (2018.01); *Y02D 70/1224* (2018.01); *Y02D 70/1242* (2018.01); *Y02D 70/1262* (2018.01); *Y02D 70/1264* (2018.01); *Y02D 70/23* (2018.01); *Y02D 70/24* (2018.01)

(58) Field of Classification Search
CPC ..... H04L 2012/5642; H04L 2012/6416; H04L 29/06455; H04L 29/08693; H04L 29/12292; H04L 47/15; H04L 47/806; H04L 49/201; H04L 49/203
USPC .......................................... 370/412, 468, 311
See application file for complete search history.

(a) Control-Plane Protocol Stack (b) User-Plane Protocol Stack (a) C-Plane connectivity of eNBs involved in dual connectivity (b) U-Plane connectivity of eNBs involved in dual connectivity

METHOD FOR MONITORING A PHYSICAL DOWNLINK CONTROL CHANNEL DURING DRX OPERATION IN A WIRELESS COMMUNICATION SYSTEM AND A DEVICE THEREFOR

This application is a 35 U.S.C. § 371 National Stage Entry of International Application No. PCT/KR2014/006149 filed Jul. 9, 2014, which claims benefit of and priority to U.S. Provisional Application No. 61/856,071 filed Jul. 19, 2013, each of which are incorporated by reference for all purposes as if fully set forth herein.

TECHNICAL FIELD

The present invention relates to a wireless communication system and, more particularly, to a method for monitoring a PDCCH during a DRX (Discontinuous Reception) operation in a wireless communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in a method and device for monitoring a PDDCH in DRX operation in a wireless communication system. The technical problems solved by the present invention are not limited to the above technical problems and those skilled in the art may understand other technical problems from the following description.

Technical Solution

The object of the present invention can be achieved by providing a method for operating by an user equipment (UE) in wireless communication system, the method comprising; receiving first DRX (Discontinuous Reception) information from the first BS; receiving second DRX information from the second BS; and monitoring a PDCCH (Physical Downlink Control Channel) for the first BS during an active time for the second BS, wherein the active time for the second BS includes one or more On Durations indicated by the second DRX information.

In another aspect of the present invention, a method for a base station (BS) operating in a wireless communication system, the method comprising: receiving, from a second BS, information related to one or more On Durations of the second BS, wherein the one or more On Durations of the second BS are in a second DRX (Discontinuous Reception) cycle being longer than a first DRX cycle; and transmitting, to a UE, a PDCCH (Physical Downlink Control Channel) at the one or more On Durations of the second BS.

In another aspect of the present invention, provided herein is a UE (User Equipment) in the wireless communication system, the UE comprising: an RF (radio frequency) module; and a processor configured to receive first DRX (Discontinuous Reception) information from the first BS, to receive second DRX information from the second BS, and to monitor a PDCCH (Physical Downlink Control Channel) for the first BS during an active time for the second BS, wherein the active time for the second BS includes one or more On Durations indicated by the second DRX information.

Preferably, the second DRX information comprises a first DRX cycle and a second DRX cycle being longer than the first DRX cycle, and the one or more On Durations are in the second DRX cycle.

Preferably, the method further comprises monitoring a PDCCH for the second BS during the active time for the second BS.

Preferably, the active time is a periodical active time.

Preferably, the UE has a single radio frequency (RF) module.

Preferably, the UE has two MAC (Medium Access Control) entities, each MAC entity is for each BS.

Preferably, the UE is connected to the first BS and the second BS.

Preferably, the first BS and the second BS are connected via non-ideal backhaul.

It is to be understood that both the foregoing general description and the following detailed description of the present invention are exemplary and explanatory and are intended to provide further explanation of the invention as claimed.

Advantageous Effects

According to the present invention, monitoring a PDDCH in a DRX operation can be efficiently performed in a wireless communication system. Specifically, monitoring a PDDCH in a DRX operation can be efficiently performed in a dual connectivity system.

It will be appreciated by persons skilled in the art that that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
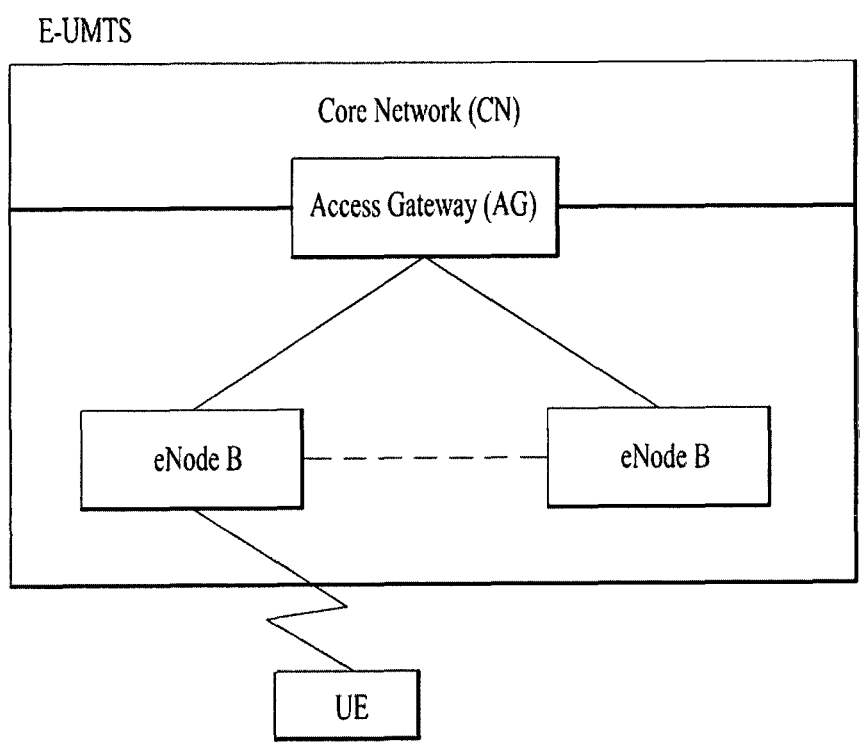
FIG. 1 is a diagram showing a network structure of an Evolved Universal Mobile Telecommunications System (E-UMTS) as an example of a wireless communication system.
Figure 2A:
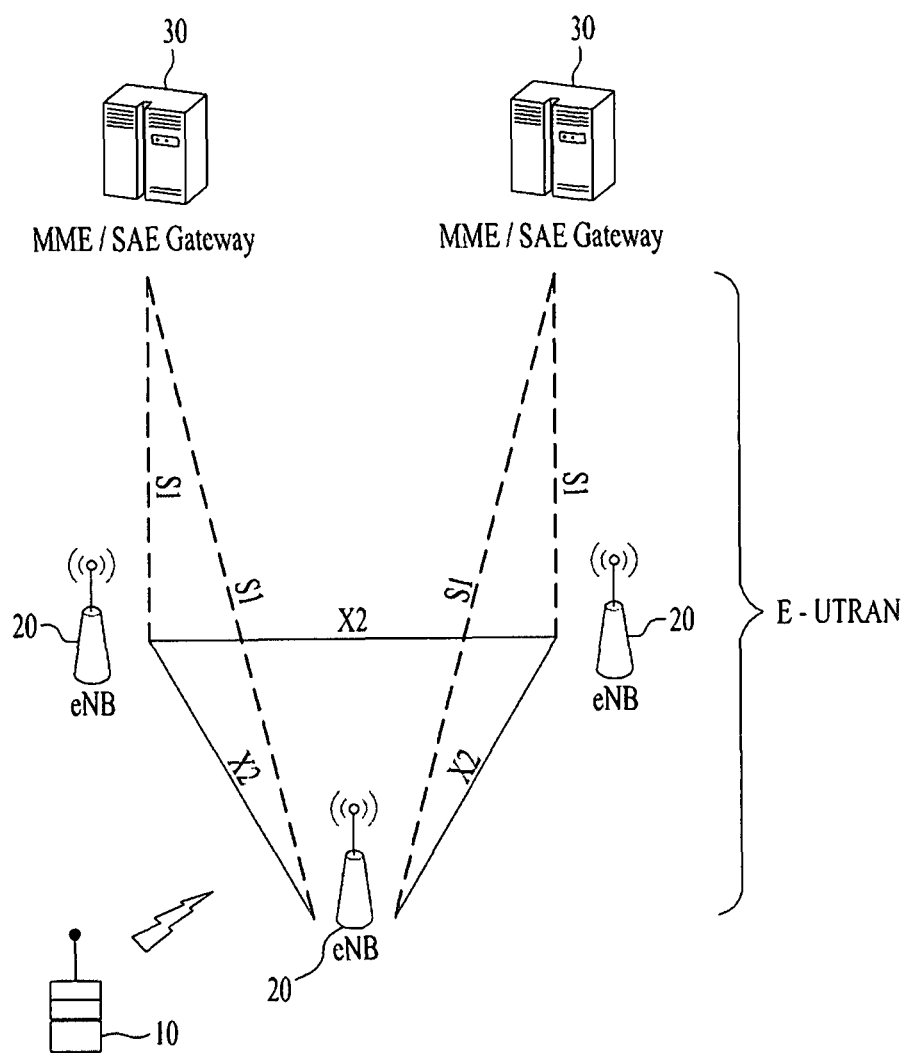
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
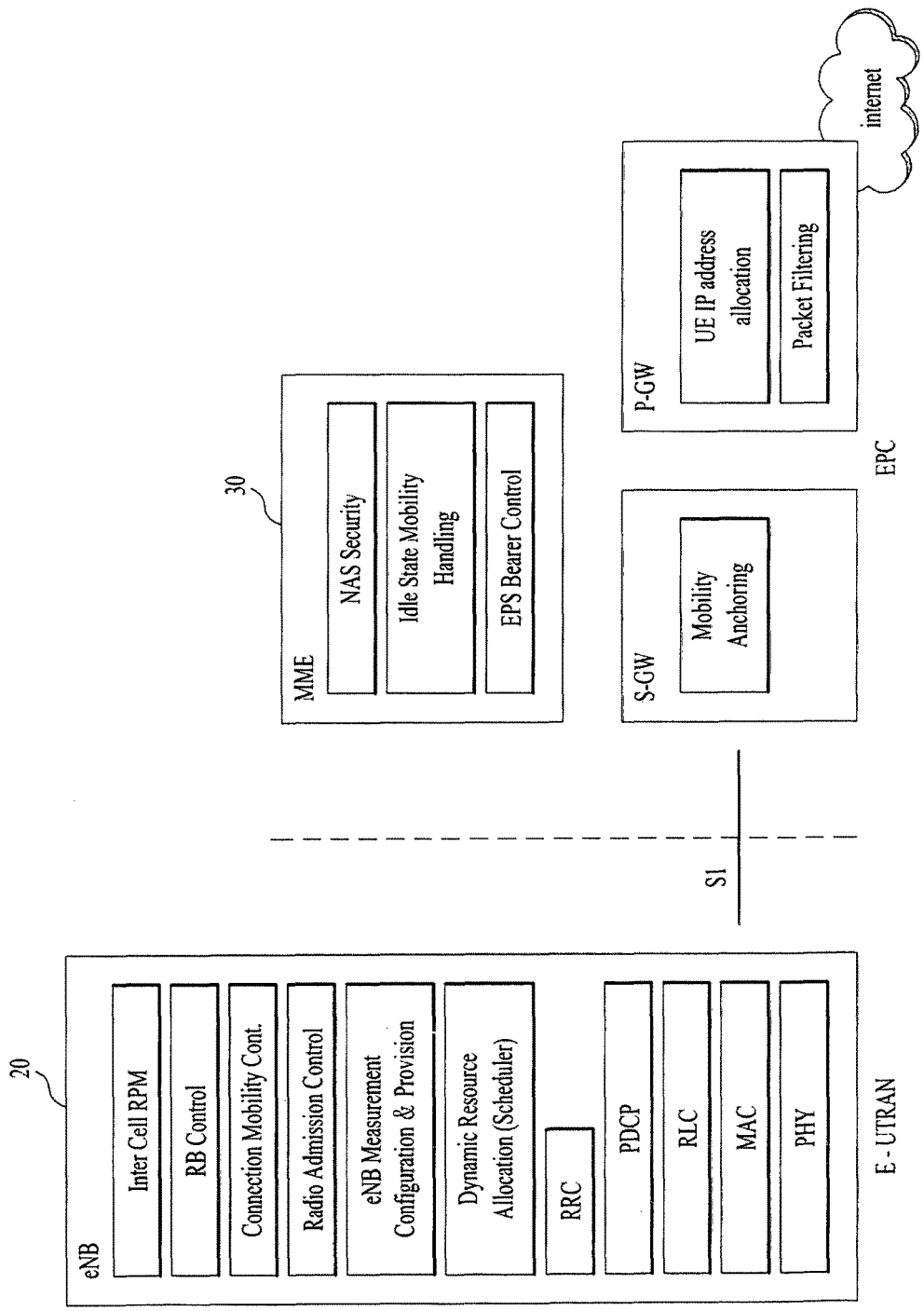
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

FIG. 2B is a block diagram depicting architecture of a typical E-UTRAN and a typical EPC. As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
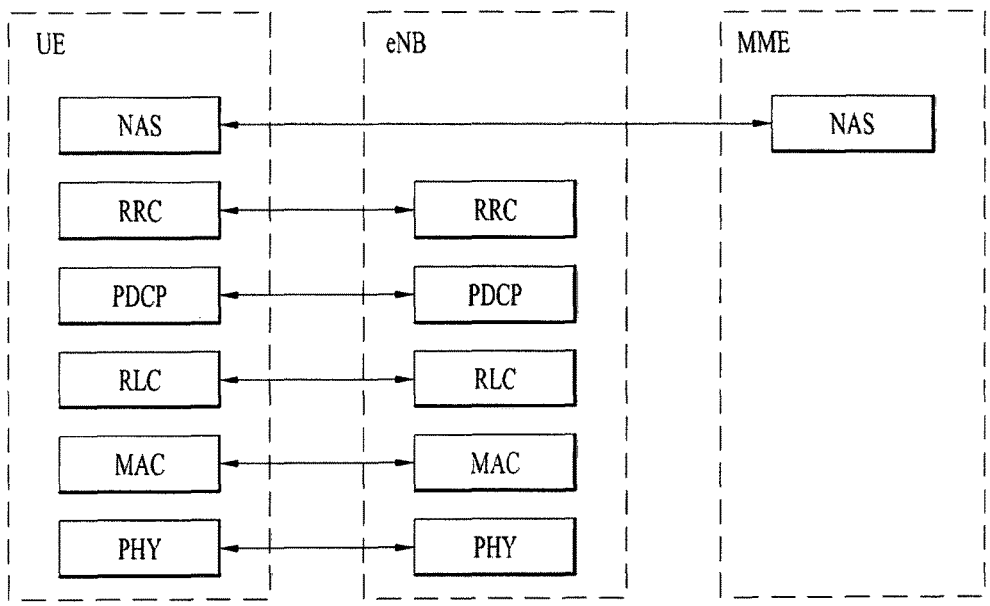
FIG. 3 is a diagram showing a control plane and a user plane of a radio interface protocol between a UE and an E-UTRAN based on a 3rd generation partnership project (3GPP) radio access network standard.
Figure 3:
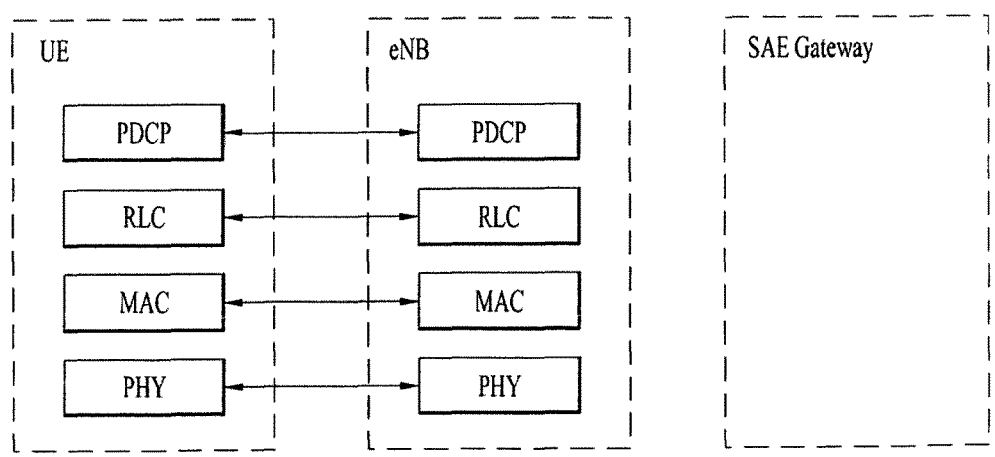

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
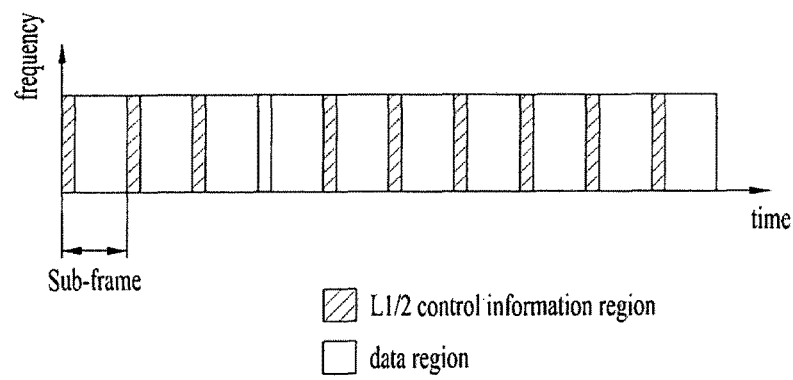
FIG. 4 is a diagram of an example physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PD-CCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
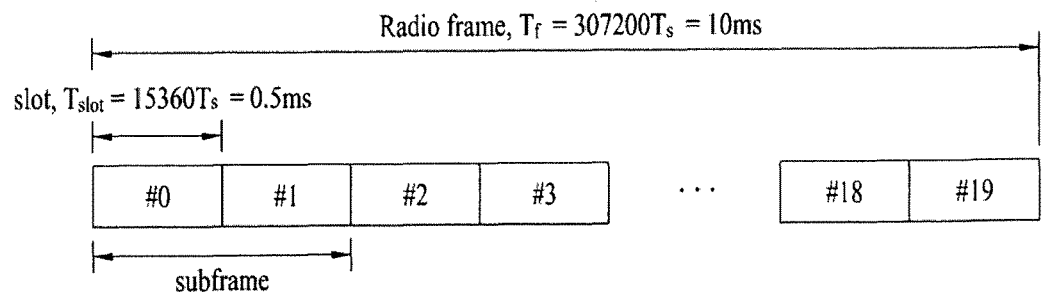
FIG. 5 is a diagram showing the structure of a radio frame used in a Long Term Evolution (LTE) system.

FIG. 5 is a diagram showing the structure of a radio frame used in an LTE system.

Referring to FIG. 5, the radio frame has a length of 10 ms (327200×Ts) and is divided into 10 subframes having the same size. Each of the subframes has a length of 1 ms and includes two slots. Each of the slots has a length of 0.5 ms (15360×Ts). Ts denotes a sampling time, and is represented by Ts=1/(15 kHz×2048)=3.2552×10−8 (about 33 ns). Each of the slots includes a plurality of OFDM symbols in a time domain and a plurality of Resource Blocks (RBs) in a frequency domain. In the LTE system, one RB includes 12 subcarriers×7 (or 6) OFDM symbols. A transmission time interval (TTI) that is a unit time for transmission of data may be determined in units of one or more subframes. The structure of the radio frame is purely exemplary and thus the number of subframes included in the radio frame, the number of slots included in a subframe, or the number of OFDM symbols included in a slot may be changed in various ways.

Figure 6:
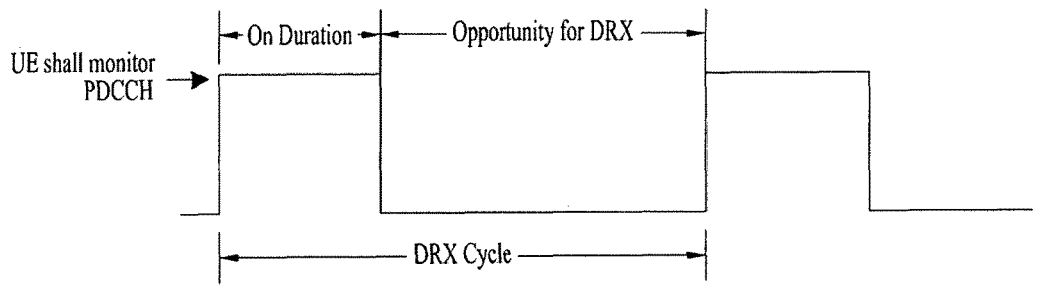
FIG. 6 is a diagram showing a concept DRX (Discontinuous Reception) operation.

FIG. 6 is a diagram showing a concept DRX (Discontinuous Reception) operation.

Referring to FIG. 6, if DRX is set for a UE in RRC_CONNECTED state, the UE attempts to receive a downlink channel, PDCCH, that is, performs PDCCH monitoring only during a predetermined time period, while the UE does not perform PDCCH monitoring during the remaining time period. A time period during which the UE should monitor a PDCCH is referred to as "On Duration". One On Duration is defined per DRX cycle. That is, a DRX cycle is a repetition period of On Duration.

The UE always monitors a PDCCH during On Duration in one DRX cycle and a DRX cycle determines a period in which On Duration is set. DRX cycles are classified into a long DRX cycle and a short DRX cycle according to the periods of the DRX cycles. The long DRX cycle may minimize the battery consumption of a UE, whereas the short DRX cycle may minimize a data transmission delay.

When the UE receives a PDCCH during On Duration in a DRX cycle, an additional transmission or a retransmission may take place during a time period other than the On Duration. Therefore, the UE should monitor a PDCCH during a time period other than the On Duration. That is, the UE should perform PDCCH monitoring during a time period over which an inactivity managing timer, drx-InactivityTimer or a retransmission managing timer, drx-RetransmissionTimer as well as an On Duration managing timer, onDurationTimer is running.

The value of each of the timers is defined as the number of subframes. The number of subframes is counted until the value of a timer is reached. If the value of the timer is satisfied, the timer expires. The current LTE standard defines drx-InactivityTimer as a number of consecutive PDCCH-subframes after successfully decoding a PDCCH indicating an initial UL or DL user data transmission and defines drx-RetransmissionTimer as a maximum number of consecutive PDCCH-subframes for as soon as a DL retransmission is expected by the UE.

Additionally, the UE should perform PDCCH monitoring during random access or when the UE transmits a scheduling request and attempts to receive a UL grant.

A time period during which a UE should perform PDCCH monitoring is referred to as an Active Time. The Active Time includes On Duration during which a PDCCH is monitored periodically and a time interval during which a PDCCH is monitored upon generation of an event.

More specifically, the Active Time includes the time while (1) onDurationTimer or drx-InactivityTimer or drx-RetransmissionTimer or mac-ContentionResolutionTimer is running, or (2) a Scheduling Request is sent on PUCCH and is pending, or (3) an uplink grant for a pending HARQ retransmission can occur and there is data in the corresponding HARQ buffer, or (4) a PDCCH indicating a new transmission addressed to the C-RNTI of the UE has not been received after successful reception of a Random Access Response for the preamble not selected by the UE.

Figure 7:
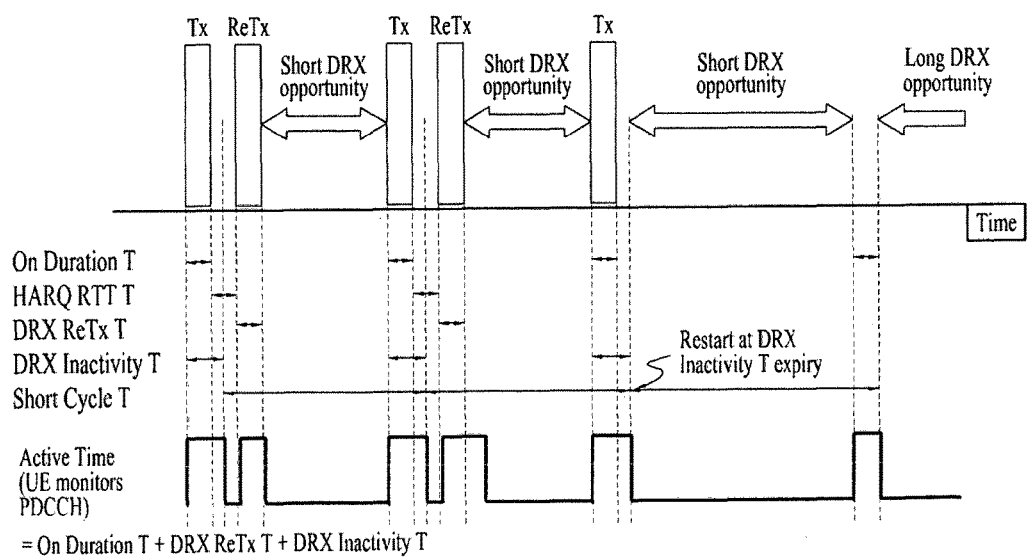
FIG. 7 is a diagram showing a method for a DRX operation in the LTE system.

FIG. 7 is a diagram showing a method for a DRX operation in the LTE system.

Referring to FIG. 7, the UE may be configured by RRC with a DRX functionality and shall perform following operations for each TTI (that is, each subframe).

If a HARQ RTT (Round Trip Time) Timer expires in this subframe and the data of the corresponding HARQ process was not successfully decoded, the UE shall start the drx-RetransmissionTimer for the corresponding HARQ process.

Further, if a DRX Command MAC control element (CE) is received, the UE shall stop onDurationTimer and drx-InactivityTimer. The DRX Command MAC CE is a command for shifting to a DRX state, and is identified by a LCID (Logical Channel ID) field of a MAC PDU (Protocol Data Unit) subheader.

Further, in case that drx-InactivityTimer expires or a DRX Command MAC CE is received in this subframe, if the Short DRX cycle is configured, the UE shall start or restart drxShortCycleTimer, and use the Short DRX Cycle. However, if the Short DRX cycle is not configured, the Long DRX cycle is used. Additionally, if drxShortCycleTimer expires in this subframe, the Long DRX Cycle is also used.

The UE shall monitor the PDCCH for a PDCCH-subframe during the Active Time. If the PDCCH indicates a DL transmission or if a DL assignment has been configured for this subframe, the UE shall start the HARQ RTT Timer for the corresponding HARQ process and stop the drx-RetransmissionTimer for the corresponding HARQ process. If the PDCCH indicates a (DL or UL) new transmission, the UE shall start or restart drx-InactivityTimer.

Here, the PDCCH-subframe is defined as a subframe with PDCCH. That is, the PDCCH-subframe is a subframe on which the PDCCH can be transmitted. More specifically, in a FDD (frequency division duplex) system, the PDCCH-subframe represents any subframe. For full-duplex TDD (time division duplex) system, the PDCCH-subframe represents the union of downlink subframes and subframes including DwPTS of all serving cells, except serving cells that are configured with schedulingCellId (that is, the Scheduled cell). Here, the schedulingCellId indicates an identity of the scheduling cell. Further, for half-duplex TDD system, the PDCCH-subframe represents the subframes where the PCell (primary cell) is configured as a downlink subframe or a subframe including DwPTS.

Meanwhile, when not in Active Time, the UE does not perform a SRS (Sounding Reference Signal) transmission and a CSI reporting, which are triggered by the eNB.

During the above DRX operation, only the HARQ RTT Timer is fixed to 8 ms, whereas the eNB indicates the other timer values, onDurationTimer, drx-InactivityTimer, drx-RetransmissionTimer, and mac-ContentionResolutionTimer to the UE by an RRC signal. The eNB also indicates a long DRX cycle and a short DRX cycle, which represent the period of a DRX cycle, to the UE by an RRC signal.

Figure 8:
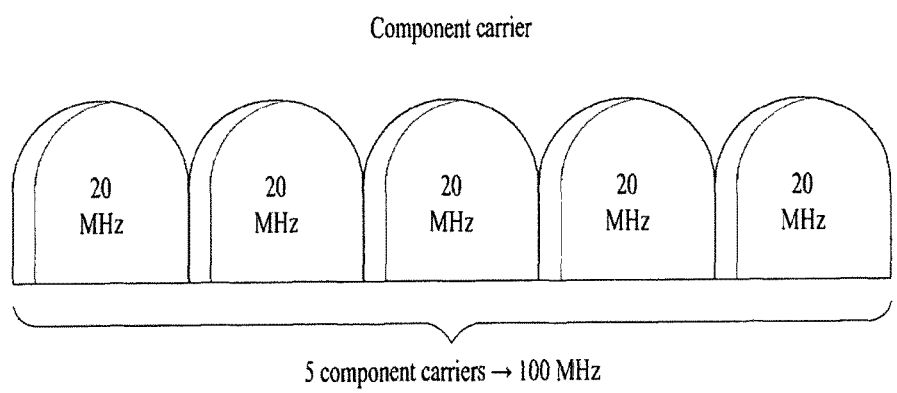
FIG. 8 is a diagram for carrier aggregation.

FIG. 8 is a diagram for carrier aggregation.

Carrier aggregation technology for supporting multiple carriers is described with reference to FIG. 8 as follows. As mentioned in the foregoing description, it may be able to support system bandwidth up to maximum 100 MHz in a manner of bundling maximum 5 carriers (component carriers: CCs) of bandwidth unit (e.g., 20 MHz) defined in a legacy wireless communication system (e.g., LTE system) by carrier aggregation. Component carriers used for carrier aggregation may be equal to or different from each other in bandwidth size. And, each of the component carriers may have a different frequency band (or center frequency). The component carriers may exist on contiguous frequency bands. Yet, component carriers existing on non-contiguous frequency bands may be used for carrier aggregation as well. In the carrier aggregation technology, bandwidth sizes of uplink and downlink may be allocated symmetrically or asymmetrically.

Multiple carriers (component carriers) used for carrier aggregation may be categorized into primary component carrier (PCC) and secondary component carrier (SCC). The PCC may be called P-cell (primary cell) and the SCC may be called S-cell (secondary cell). The primary component carrier is the carrier used by a base station to exchange traffic and control signaling with a user equipment. In this case, the control signaling may include addition of component carrier, setting for primary component carrier, uplink (UL) grant, downlink (DL) assignment and the like. Although a base station may be able to use a plurality of component carriers, a user equipment belonging to the corresponding base station may be set to have one primary component carrier only. If a user equipment operates in a single carrier mode, the primary component carrier is used. Hence, in order to be independently used, the primary component carrier should be set to meet all requirements for the data and control signaling exchange between a base station and a user equipment.

Meanwhile, the secondary component carrier may include an additional component carrier that can be activated or deactivated in accordance with a required size of transceived data. The secondary component carrier may be set to be used only in accordance with a specific command and rule received from a base station. In order to support an additional bandwidth, the secondary component carrier may be set to be used together with the primary component carrier. Through an activated component carrier, such a control signal as a UL grant, a DL assignment and the like can be received by a user equipment from a base station. Through an activated component carrier, such a control signal in UL as a channel quality indicator (CQI), a precoding matrix index (PMI), a rank indicator (RI), a sounding reference signal (SRS) and the like can be transmitted to a base station from a user equipment.

Resource allocation to a user equipment can have a range of a primary component carrier and a plurality of secondary component carriers. In a multi-carrier aggregation mode, based on a system load (i.e., static/dynamic load balancing), a peak data rate or a service quality requirement, a system may be able to allocate secondary component carriers to DL and/or UL asymmetrically. In using the carrier aggregation technology, the setting of the component carriers may be provided to a user equipment by a base station after RRC connection procedure. In this case, the RRC connection may mean that a radio resource is allocated to a user equipment based on RRC signaling exchanged between an RRC layer of the user equipment and a network via SRB. After completion of the RRC connection procedure between the user equipment and the base station, the user equipment may be provided by the base station with the setting information on the primary component carrier and the secondary component carrier. The setting information on the secondary component carrier may include addition/deletion (or activation/deactivation) of the secondary component carrier. Therefore, in order to activate a secondary component carrier between a base station and a user equipment or deactivate a previous secondary component carrier, it may be necessary to perform an exchange of RRC signaling and MAC control element.

The activation or deactivation of the secondary component carrier may be determined by a base station based on a quality of service (QoS), a load condition of carrier and other factors. And, the base station may be able to instruct a user equipment of secondary component carrier setting using a control message including such information as an indication type (activation/deactivation) for DL/UL, a secondary component carrier list and the like.

Figure 9:
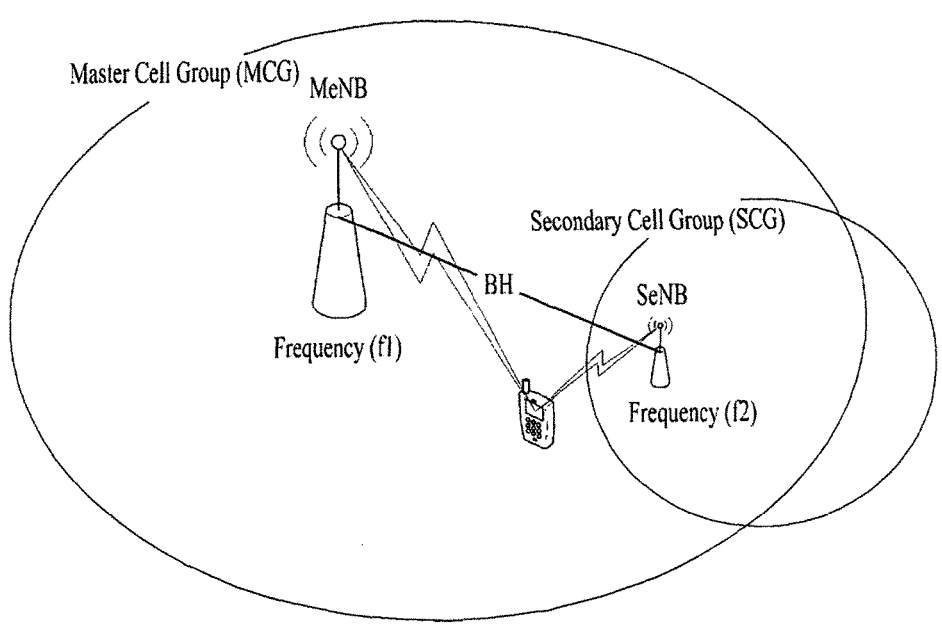
FIG. 9 is a conceptual diagram for dual connectivity (DC) between a Master Cell Group (MCG) and a Secondary Cell Group (SCG)

FIG. 9 is a conceptual diagram for dual connectivity (DC) between a Master Cell Group (MCG) and a Secondary Cell Group (SCG).

The dual connectivity means that the UE can be connected to both a Master eNode-B (MeNB) and a Secondary eNode-B (SeNB) at the same time. The MCG is a group of serving cells associated with the MeNB, comprising of a PCell and optionally one or more SCells. And the SCG is a group of serving cells associated with the SeNB, comprising of the special SCell and optionally one or more SCells. The MeNB is an eNB which terminates at least S1-MME (S1 for the control plane) and the SeNB is an eNB that is providing additional radio resources for the UE but is not the MeNB.

With dual connectivity, some of the data radio bearers (DRBs) can be offloaded to the SCG to provide high throughput while keeping scheduling radio bearers (SRBs) or other DRBs in the MCG to reduce the handover possibility. The MCG is operated by the MeNB via the frequency of f1, and the SCG is operated by the SeNB via the frequency of f2. The frequency f1 and f2 may be equal. The backhaul interface (BH) between the MeNB and the SeNB is non-ideal (e.g. X2 interface), which means that there is considerable delay in the backhaul and therefore the centralized scheduling in one node is not possible.

Figure 10A:
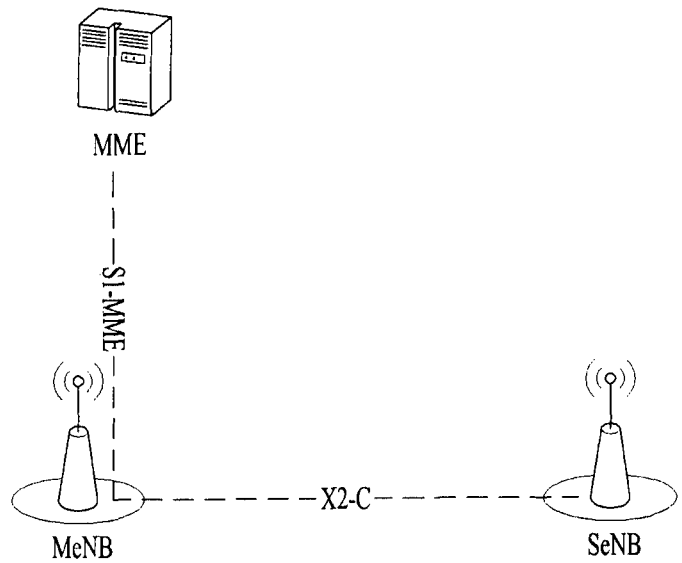
FIG. 10a shows C-plane (Control Plane) connectivity of eNBs involved in dual connectivity for a certain UE and, FIG. 10b shows U-plane (User Plane) connectivity of eNBs involved in dual connectivity for a certain UE.

FIG. 10a shows C-plane (Control Plane) connectivity of eNBs involved in dual connectivity for a certain UE: The MeNB is C-plane connected to the MME via S1-MME, the MeNB and the SeNB are interconnected via X2-C(X2-Control plane). As FIG. 10a, Inter-eNB control plane signaling for dual connectivity is performed by means of X2 interface signaling. Control plane signaling towards the MME is performed by means of S1 interface signaling. There is only one S1-MME connection per UE between the MeNB and the MME. Each eNB should be able to handle UEs independently, i.e. provide the PCell to some UEs while providing SCell(s) for SCG to others. Each eNB involved in dual connectivity for a certain UE owns its radio resources and is primarily responsible for allocating radio resources of its cells, respective coordination between MeNB and SeNB is performed by means of X2 interface signaling.

Figure 10B:
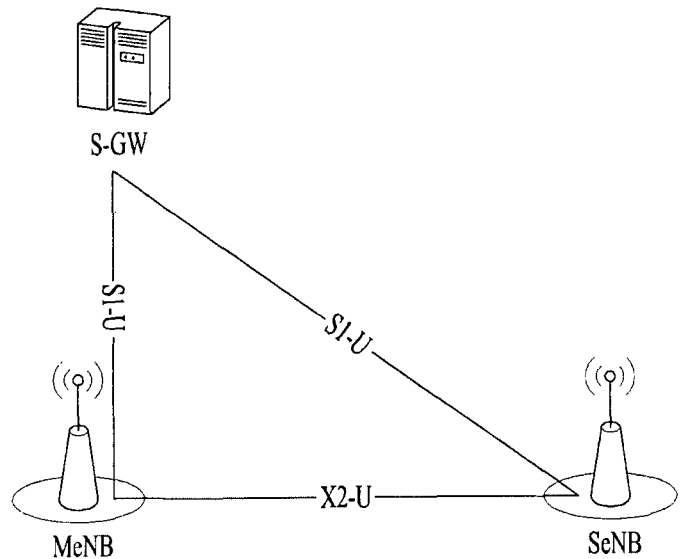

FIG. 10b shows U-plane connectivity of eNBs involved in dual connectivity for a certain UE. U-plane connectivity depends on the bearer option configured: i) For MCG bearers, the MeNB is U-plane connected to the S-GW via S1-U, the SeNB is not involved in the transport of user plane data, ii) For split bearers, the MeNB is U-plane connected to the S-GW via S1-U and in addition, the MeNB and the SeNB are interconnected via X2-U, and iii) For SCG bearers, the SeNB is directly connected with the S-GW via S1-U. If only MCG and split bearers are configured, there is no S1-U termination in the SeNB. In the dual connectivity, enhancement of the small cell is required in order to data offloading from the group of macro cells to the group of small cells. Since the small cells can be deployed apart from the macro cells, multiple schedulers can be separately located in different nodes and operate independently from the UE point of view. This means that different scheduling node would encounter different radio resource environment, and hence, each scheduling node may have different scheduling results.

Figure 11:
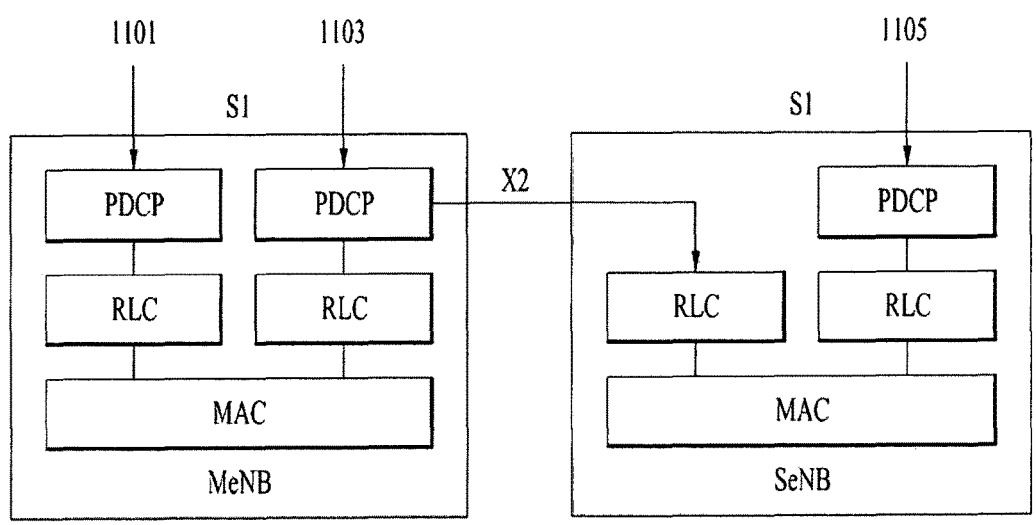
FIG. 11 is a conceptual diagram for radio protocol architecture for dual connectivity.

FIG. 11 is a conceptual diagram for radio protocol architecture for dual connectivity.

E-UTRAN of the present example can support dual connectivity operation whereby a multiple receptions/transmissions(RX/TX) UE in RRC_CONNECTED is configured to utilize radio resources provided by two distinct schedulers, located in two eNBs (or base stations) connected via a non-ideal backhaul over the X2 interface. The eNBs involved in dual connectivity for a certain UE may assume two different roles: an eNB may either act as the MeNB or as the SeNB. In dual connectivity, a UE can be connected to one MeNB and one SeNB.

In the dual connectivity operation, the radio protocol architecture that a particular bearer uses depends on how the bearer is setup. Three alternatives exist, MCG bearer (1101), split bearer (1103) and SCG bearer (1105). Those three alternatives are depicted on FIG. 11. The SRBs (Signaling Radio Bearers) are always of the MCG bearer and therefore only use the radio resources provided by the MeNB. The MCG bearer (1101) is a radio protocol only located in the MeNB to use MeNB resources only in the dual connectivity. And the SCG bearer (1105) is a radio protocol only located in the SeNB to use SeNB resources in the dual connectivity.

Specially, the split bearer (1103) is a radio protocol located in both the MeNB and the SeNB to use both MeNB and SeNB resources in the dual connectivity and the split bearer (803) may be a radio bearer comprising one Packet Data Convergence Protocol (PDCP) entity, two Radio Link Control (RLC) entities and two Medium Access Control (MAC) entities for one direction. Specially, the dual connectivity operation can also be described as having at least one bearer configured to use radio resources provided by the SeNB.

Figure 12:
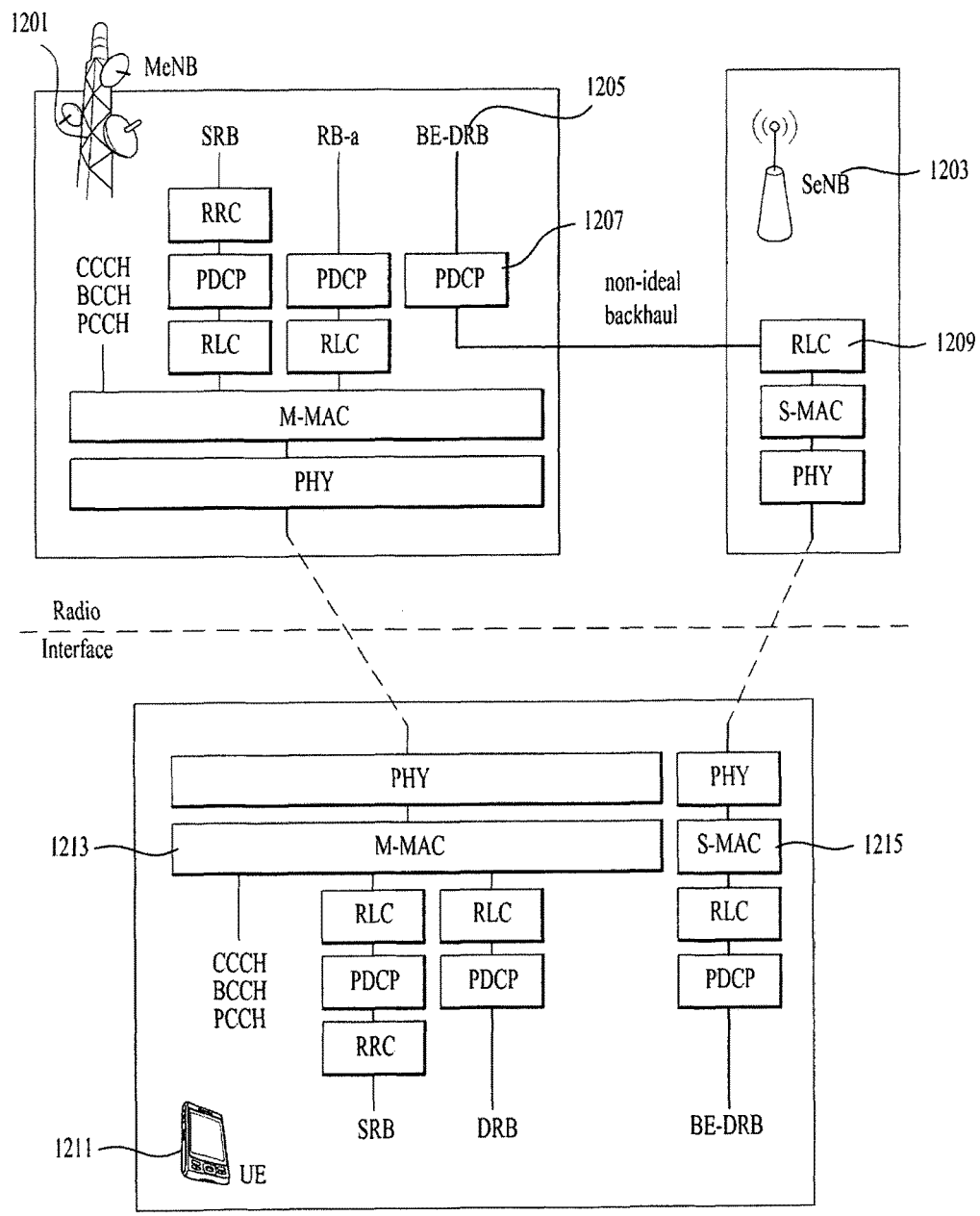
FIG. 12 is a conceptual diagram for one of radio protocol architecture for dual connectivity.

FIG. 12 is a conceptual diagram for one of radio protocol architecture for dual connectivity.

In LTE Rel-12, a new study on dual connectivity, i.e. UE is connected to both MeNB (1201) and SeNB (1203), as shown in FIG. 12. In FIG. 12, the interface between MeNB (1201) and SeNB (1203) is called Xn interface. The Xn interface is assumed to be non-ideal; i.e. the delay in Xn interface could be up to 60 ms, but it is not limited thereto.

By the way, the SeNB (1203) is responsible for transmitting best effort (BE) type traffic, while the MeNB (1201) is responsible for transmitting other types of traffic such as VoIP, streaming data, or signaling data. To support dual connectivity, various protocol architectures are studied, and one of potential architectures (1205) is shown in FIG. 12. In this architecture (1205), PDCP and RLC entities are located in different network nodes, i.e. the PDCP entity (1207) in MeNB (1201) and RLC entity (1209) in SeNB (1203). In the UE side (1211), the protocol architecture is same as prior art except that the MAC entity is setup for each eNB (i.e. MeNB and SeNB). This is because the scheduling nodes are located in different nodes and two nodes are linked with non-ideal backhaul.

The two MAC entities in UE, i.e. M-MAC (1213) and S-MAC (1215), are operating independently because scheduling nodes of each MAC are located in different network nodes. Therefore, all the MAC functions including DRX operation are also independent between M-MAC (1213) and S-MAC (1215).

When DRX is configured, the UE monitors PDCCH in Active Time. Therefore, the UE may monitor a PDCCH of the MCG in M-MAC Active Time and a PDCCH of the SCG in S-MAC Active Time. However, if the UE uses a single RF receiver, the UE will be anyway wake up if one of MAC is in Active Time. If the UE monitors both PDCCHs when it wakes up, the scheduling flexibility of MeNB and SeNB would be much increased.

Figure 13:
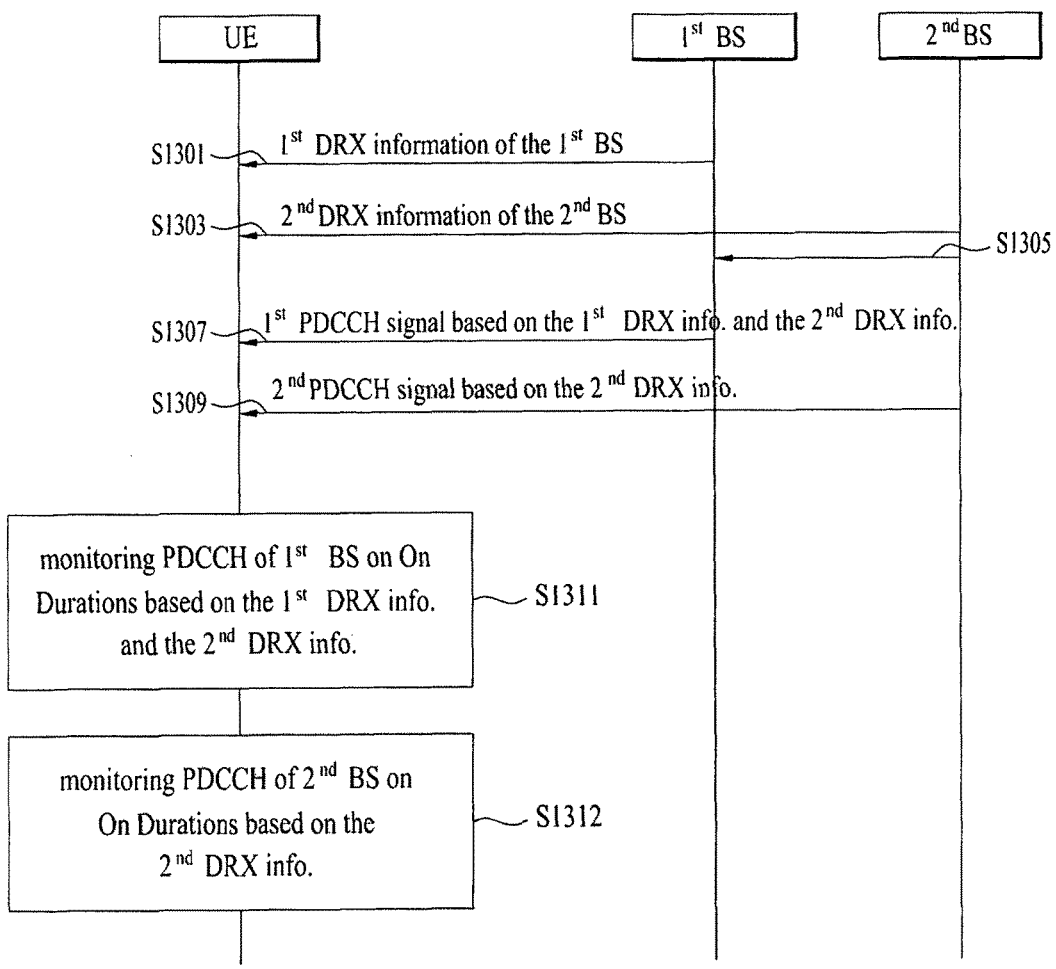
FIG. 13 is a conceptual diagram for monitoring PDCCH in DRX operation according to embodiments of the present invention.

FIG. 13 is a conceptual diagram for monitoring PDCCH when the UE is configured in DRX operation according to embodiments of the present invention.

To give more scheduling flexibility to base stations, it is invented that if the UE is configured with multiple DRX for multiple BSs, the UE can monitor PDCCHs of multiple BSs during the Active Time of any of configured multiple DRX.

It can be supposed that following:
The invention can apply when the UE uses single RF receiver.
The invention can apply when the UE has multiple MAC entities, one MAC entity for each BS.
A DRX pattern can be configured for each cell, and managed by a corresponding MAC entity.
A PDCCH can be configured for each BS.
The UE can be in Active Time due to various reasons, but they can be classified into two categories.
Periodical: On Duration of Short DRX and Long DRX
Event-trigger: all other reasons except On Duration (e.g. PDCCH reception, SR pending, etc.)
If each MAC entity operates independently, one MAC does not know the DRX status in other MAC in dual connectivity. Therefore, a MAC entity cannot know the event-triggered Active Time in another MAC entity, and it is difficult to make the UE to monitor all PDCCHs in event-triggered Active Time.

By the way, even if the On Duration of Short DRX cycle is periodical, it is difficult for other MAC to predict the Active Time due to On Duration of Short DRX cycle, because the transition to Short DRX cycle is also event triggered. The only Active Time that is fixed and predictable by other MAC entities is On Duration of Long DRX cycle. Since the Long DRX cycle is integer number of Short DRX cycle, and the On Duration of Long DRX cycle is coincides with On Duration of Short DRX cycle, one MAC entity can always know that other MAC entity is in Active Time due to On Duration of Long DRX cycle.

Therefore, the invention can be further modified as follows.

It is supposed that the UE is connected with both a first BS and a second BS in dual connectivity. Desirably, the first BS may be an MeNB in a MCG and the second BS may be a SeNB in a SCG, and vice versa.

The UE receive first DRX information from the first BS (S1301). And the UE also receive second DRX information from the second BS (S1303). When the step of S1303 is performed, the second BS may transmit second DRX information to the first BS (S1305). The first BS and the second BS can be connected via non-ideal backhaul, but it is not limited thereto.

In the step of S1305, the second DRX information can comprise a short DRX cycle and a long DRX cycle being longer than the short DRX cycle. Desirably, the second DRX information can comprise information related to On Durations of a long DRX cycle.

Since the long DRX cycle is integer number of Short DRX cycle, On Durations of long DRX cycle can be coincides with On Duration of Short DRX cycle. And the On Durations of long DRX cycle can be fixed and predictable by other MAC entities.

The first BS can transmit a downlink grant or an uplink grant through a PDCCH of the first BS at On Durations of the second BS as well as On Durations of the first BS (S1307). Desirably, the On Durations of the second BS can be in the long DRX cycle, but it is not limited thereto. And the second BS can transmit a downlink grant or an uplink grant through a PDCCH of the second BS at On Durations of the second BS (S1309).

The UE can monitor a PDCCH for the first BS during an active time comprising one or more On Durations for a first BS and one or more On Durations for a second BS (S1311). That means, if the UE is configured with multiple DRX for multiple BSs, the UE can monitor PDCCHs of multiple BSs during the On Duration of DRX of any of configured multiple DRX.

Desirably, the one or more On Durations for a first BS can be in either a short DRX cycle or a long DRX cycle. On the other hand, the one or more On Durations for the second BS can be in not a short DRX cycle but a long DRX cycle. That means, the UE can monitor a PDDCH of each BS during the Active Time of each configured DRX other than the Active Time due to On Durations of Long DRX cycle. Because the UE can know On Durations for first BS and On Durations for the second BS through the steps of S1301 and S1303, the UE can monitor a PDCCH for the first BS at On Durations for first BS and On Durations for the second BS. In this manner, the On Durations of the second BS can be in the long DRX cycle, but it is not limited thereto.

The UE can monitor a PDCCH for the second BS during the Active Time for the second BS (S1313). In this manner, the On Durations of the second BS can be in the short DRX cycle or long DRX cycle.

Figure 14:
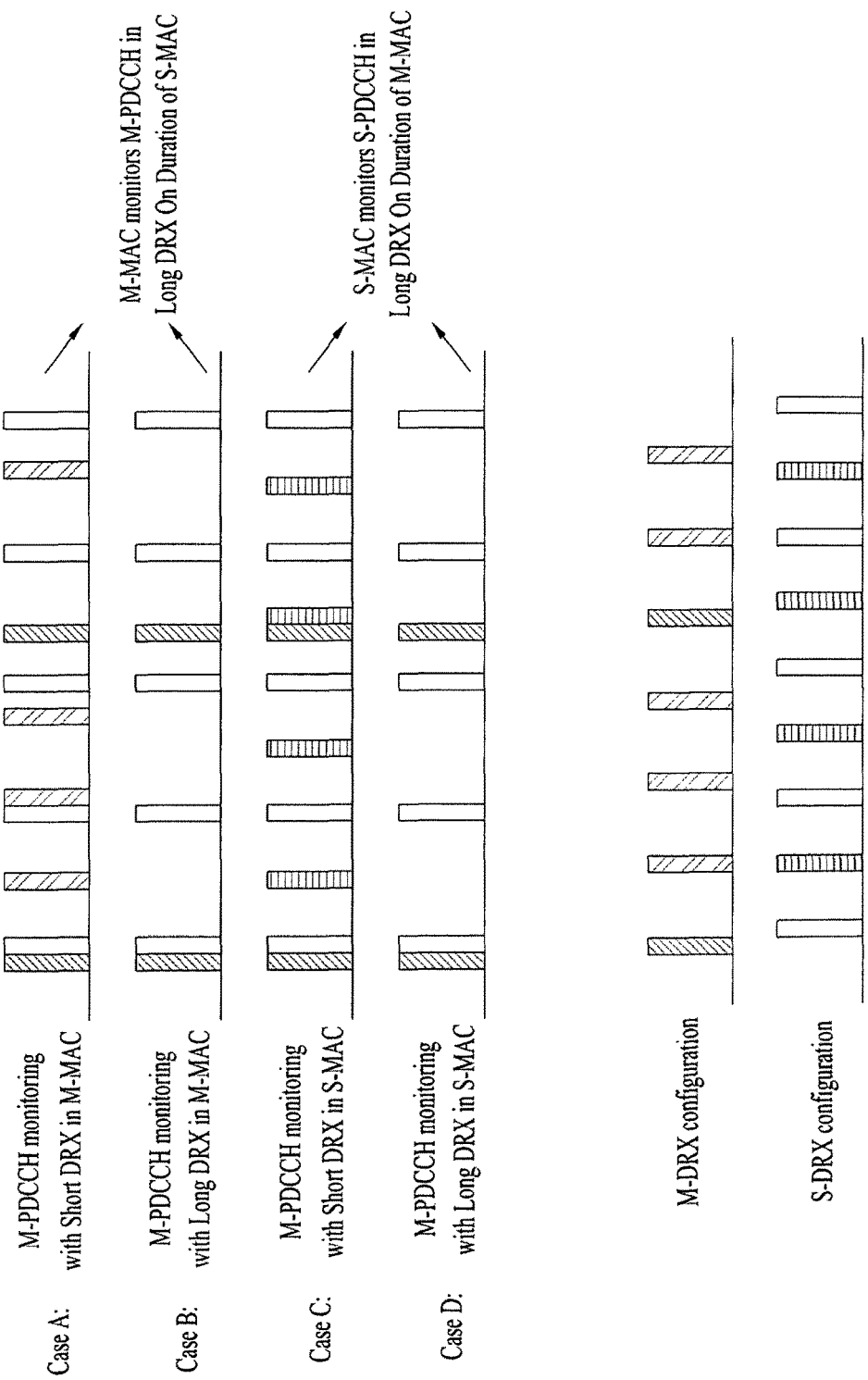
FIG. 14 is a diagram for an example of multiple DRX configurations for dual connectivity according to embodiments of the present invention.

FIG. 14 is a diagram for an example of multiple DRX configurations for dual connectivity according to embodiments of the present invention.

The UE is configured with two MAC entities, i.e. M-MAC (1403) for MeNB (1401) and S-MAC (1407) for SeNB (1405), and communicate with MeNB (1401) and SeNB (1405) with M-MAC (1403) and S-MAC (1407), respectively. For the DRX operation, the MeNB (1401) can configure M-DRX (1409) and the SeNB (1405) can configure S-DRX (1411) to the UE, respectively.

The UE can monitor M-PDCCH during the Active Time of M-DRX (1409), and S-PDCCH during the Active Time of S-DRX (1411). The Active Time includes On Duration of both Short DRX cycle and Long DRX cycle, and also includes other subframes defined in prior art.

When the UE receives M-DRX configuration (1409) from the MeNB (1401), it can configure M-MAC (1403) with M-DRX configuration (1409), and can also inform S-MAC (1407) about the On Duration of M-DRX. Also, when the UE receives S-DRX configuration (1411) from the SeNB, it can configure S-MAC (1407) with S-DRX configuration (1411), and can inform M-MAC (1403) about the On Duration of S-DRX. By this procedure, the M-MAC (1403) and S-MAC (1407) can share the information about other MAC's long DRX On Duration (1413).

Figure 15:
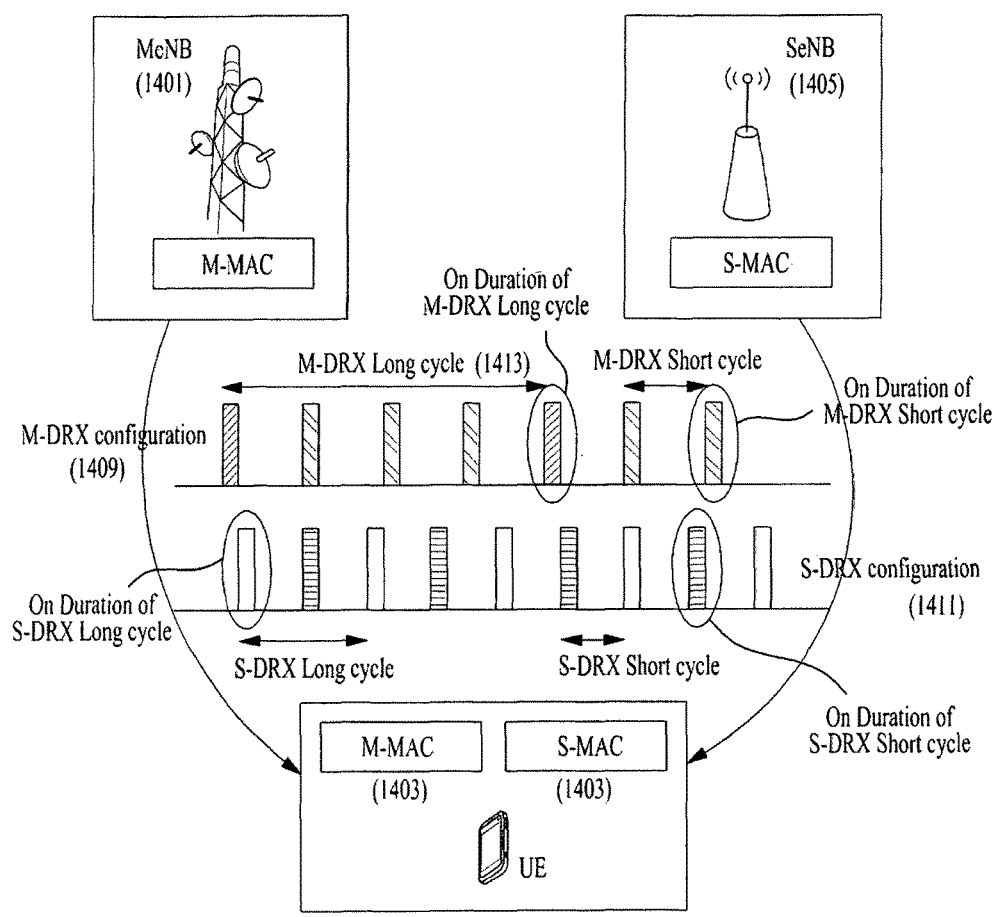
FIG. 15 is an example of monitoring PDCCH in each MAC entity according to embodiments of the present invention.

FIG. 15 is an example of monitoring PDCCH in each MAC entity according to embodiments of the present invention.

A case A is when the M-MAC is in Short DRX. In this case, the M-MAC monitors M-PDCCH in all the following subframes: i) On Duration of Short M-DRX, ii) M-MAC Active Time other than On Duration of Short M-DRX and iii) On Duration of Long S-DRX.

A case B is when the M-MAC is in Long DRX. In this case, the M-MAC monitors M-PDCCH in all the following subframes: i) On Duration of Long M-DRX, ii) S-MAC Active Time other than On Duration of Short S-DRX, and iii) On Duration of Long M-DRX.

A case C is when the S-MAC is in Short DRX. In this case, the S-MAC monitors S-PDCCH in all the following subframes: i) On Duration of Short S-DRX, ii) S-MAC Active Time other than On Duration of Short S-DRX, and iii) On Duration of Long M-DRX.

A case D is when the S-MAC is in Long DRX. In this case, the S-MAC monitors S-PDCCH in all the following subframes: i) On Duration of Long S-DRX, ii) S-MAC Active Time other than On Duration of Long S-DRX, and iii) On Duration of Long M-DRX.

Consequently, the UE monitors both M-PDCCH and S-PDCCH when at least one of Long M-DRX and Long S-DRX is On Duration. In the other cases, the UE monitors M-PDCCH following M-DRX and S-PDCCH following S-DRX.

Figure 16:
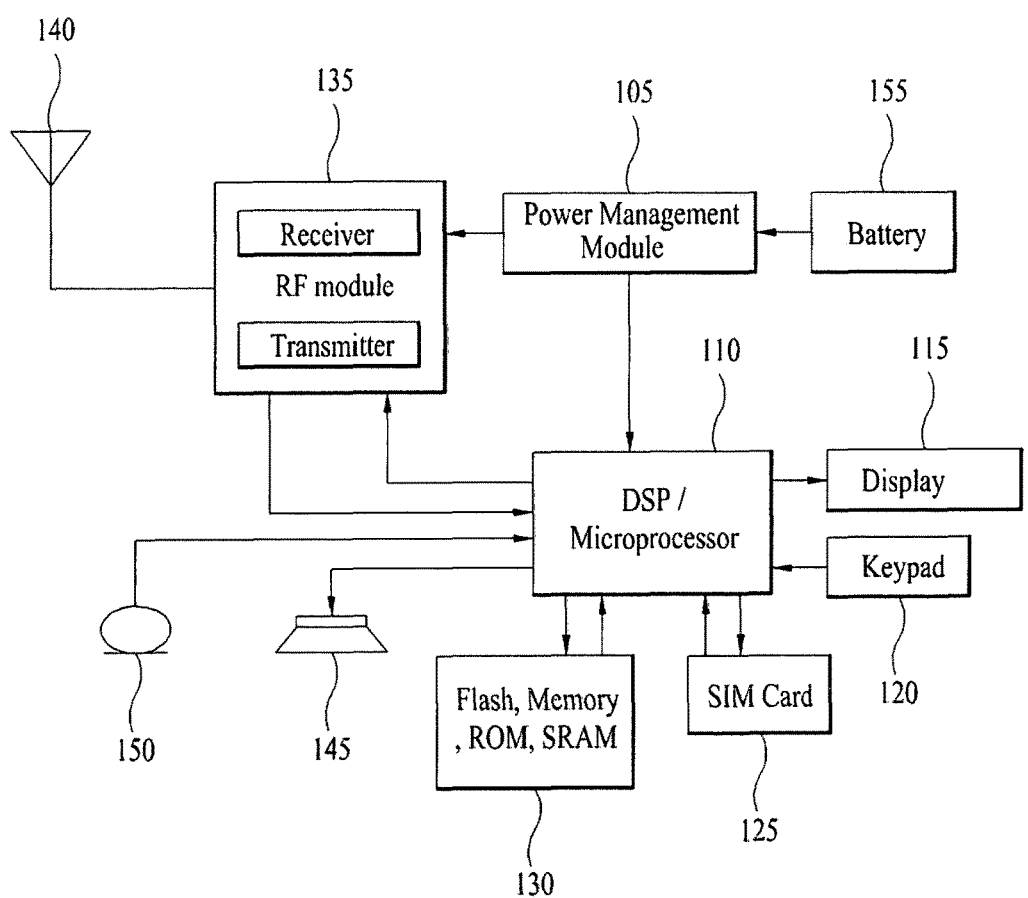
FIG. 16 is a block diagram of a communication apparatus according to an embodiment of the present invention.

FIG. 16 is a block diagram of a communication apparatus according to an embodiment of the present invention.

The apparatus shown in FIG. 16 can be a user equipment (UE) and/or eNB adapted to perform the above mechanism, but it can be any apparatus for performing the same operation.

As shown in FIG. 16, the apparatus may comprises a DSP/microprocessor (110) and RF module (transmiceiver; 135). The DSP/microprocessor (110) is electrically connected with the transciver (135) and controls it. The apparatus may further include power management module (105), battery (155), display (115), keypad (120), SIM card (125), memory device (130), speaker (145) and input device (150), based on its implementation and designer's choice.

Specifically, FIG. 16 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 16 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a user equipment (UE) operating in a wireless communication system comprising a first base station (BS) and a second BS, the method comprising:
   receiving, from the first BS, first DRX (Discontinuous Reception) information indicating one or more On Durations for the first BS for monitoring a first PDCCH (Physical Downlink Control Channel) transmitted from the first BS;
   monitoring, using the first DRX information, a second PDCCH (Physical Downlink Control Channel) transmitted from the second BS during the one or more On Durations for the first BS, wherein the one or more On Durations for the first BS are different from one or more On Durations for the second BS.

2. The method according to claim 1,
   wherein the first DRX information includes a first DRX cycle that is longer than a second DRX cycle included in second DRX information, and
   wherein the first DRX cycle defines a period in which one On Duration for the first BS is set, and the second DRX cycle defines a period in which one On Duration for the second BS is set.

3. The method according to claim 1, the method further comprising:
   monitoring the first PDCCH transmitted from the first BS during the one or more On Durations for the first BS using the first DRX information.

4. The method according to claim 1, wherein the one or more On Durations for the first and second BS are periodical.

5. The method according to claim 1, wherein the UE has a first MAC (Medium Access Control) entity and a second MAC entity, and wherein the first MAC entity is connected to a first physical layer of the UE for monitoring the first PDCCH and the second MAC entity is connected to a second physical layer of the UE for monitoring the second PDCCH.

6. The method according to claim 1, wherein the UE has a single radio frequency (RF) module.

7. A method for a first base station (BS) operating in a wireless communication system, the method comprising:
   receiving, from a second BS, DRX information for the second BS, indicating one or more On Durations for the second BS for monitoring, by a User Equipment (UE), a PDCCH (Physical Downlink Control Channel) transmitted from the second BS; and transmitting, to the UE, a PDCCH during the one or more On Durations for the second BS using the DRX information of the second BS, wherein the one or more On Durations for the second BS are different from one or more On Durations for the first BS.

8. The method according to claim 7, wherein the UE is connected to the first BS and the second BS.

9. The method according to claim 7, wherein the first BS and the second BS are connected via non-ideal backhaul.

10. A user equipment (UE) operating in a wireless communication system comprising a first base station (BS) and a second BS, the UE comprising:
- a receiver; and
- a processor that:
  - controls the receiver to receive first DRX (Discontinuous Reception) information from the first BS indicating one or more On Durations for the first BS for monitoring a first PDCCH (Physical Downlink Control Channel) transmitted from the first BS, and
  - monitors, using the first DRX information, a second PDCCH transmitted from the second BS during the one or more On Durations for the first BS, wherein the one or more On Durations for the first BS are different from one or more On Durations for the second BS.

11. The UE according to claim 10,
wherein the first DRX information includes a first DRX cycle which is longer than a second DRX cycle included in second DRX information, and
wherein the first DRX cycle defines a period in which one On Duration for the first BS is set and the second DRX cycle defines a period in which one On Duration for the second BS is set.

12. The UE according to claim 10, wherein the processor further monitors the first PDCCH transmitted from the first BS during the one or more On Durations for the first BS using the first DRX information.

13. The UE according to claim 10, wherein the one or more On Durations for the first and second BS are periodical.

14. The UE according to claim 10, wherein the UE has a first MAC (Medium Access Control) entity and a second MAC entity, and wherein the first MAC entity is connected to a first physical layer of the UE for monitoring the first PDCCH and the second MAC entity is connected to a second physical layer of the UE for monitoring the second PDCCH.

15. The UE according to claim 10, wherein the UE has a single radio frequency (RF) module.

16. A first base station (BS) operating in a wireless communication system, the first BS comprising:
- a transmitter and receiver; and
- a processor that:
  - controls the receiver to receive, from a second BS, DRX information of a second BS indicating one or more On Durations for the second BS for monitoring, by a User Equipment (UE), a PDCCH (Physical Downlink Control Channel) transmitted from the second BS, and
  - controls the transmitter to transmit, to the UE, a PDCCH during the one or more On Durations of the second BS using the DRX information of the second BS, wherein the one or more On Durations for the second BS are different from one or more On Durations for the first BS.

17. The first BS according to claim 16, wherein the UE is connected to the first BS and the second BS.

18. The first BS according to claim 16, wherein the first BS and the second BS are connected via non-ideal backhaul.

* * * * *